June 29, 1943.                    U. A. INMAN                    2,322,939
                         VEHICLE WHEEL BALANCE TESTER
                         Filed March 21, 1939        2 Sheets-Sheet 1

INVENTOR.
ULYSSES A. INMAN.
BY
ATTORNEY.

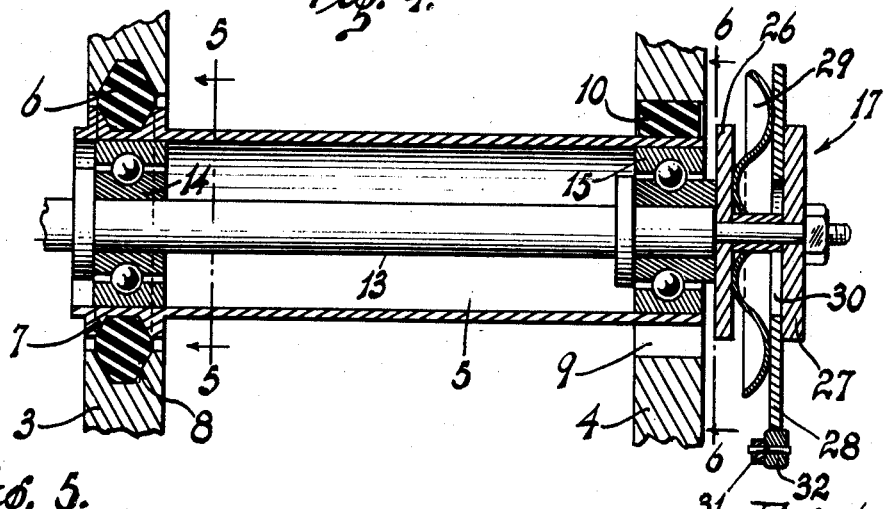
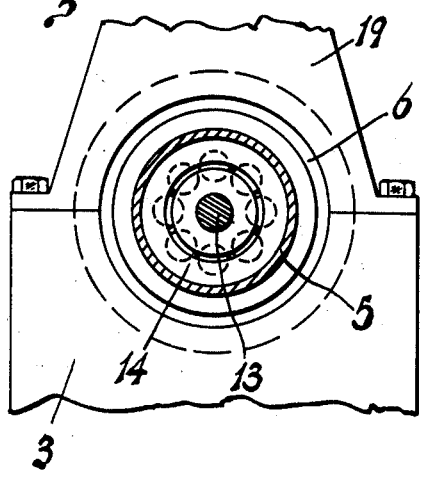
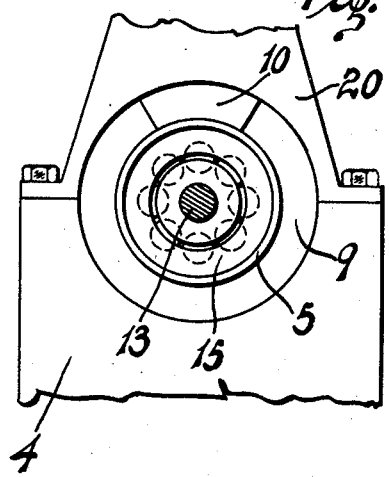

Patented June 29, 1943

2,322,939

UNITED STATES PATENT OFFICE 2,322,939

VEHICLE WHEEL BALANCE TESTER

Ulysses A. Inman, Long Beach, Calif.

Application March 21, 1939, Serial No. 263,134

11 Claims. (Cl. 73—53)

This invention relates to the art of testing the balance characteristics of rotatable objects, and is concerned with the provision of a novel apparatus which is particularly useful for testing pneumatic tired vehicle wheels to enable them to be both statically and dynamically balanced.

An object of my invention is to provide a novel balance tester suitable for use on vehicle wheels, which will indicate to the operator both the amount and position of dynamic unbalance in such wheels.

Another object is to provide a novel vehicle wheel balance tester of the character stated, which is simple in construction, inexpensive to manufacture, and effective in operation.

A feature of my invention resides in the novel disk which indicates the position and amount of dynamic unbalance in the vehicle wheel.

Other objects, advantages and features of invention may appear from the accompanying drawings, the subjoined detailed description, and the appended claims.

In the drawings:

Figure 4 is a fragmentary, longitudinal, sectional view of the sleeve and mounting therefor.

Figure 5 is a fragmentary, sectional view taken on line 5—5 of Figure 4.

Figure 6 is a fragmentary, sectional view taken on line 6—6 of Figure 4.

Figure 1:
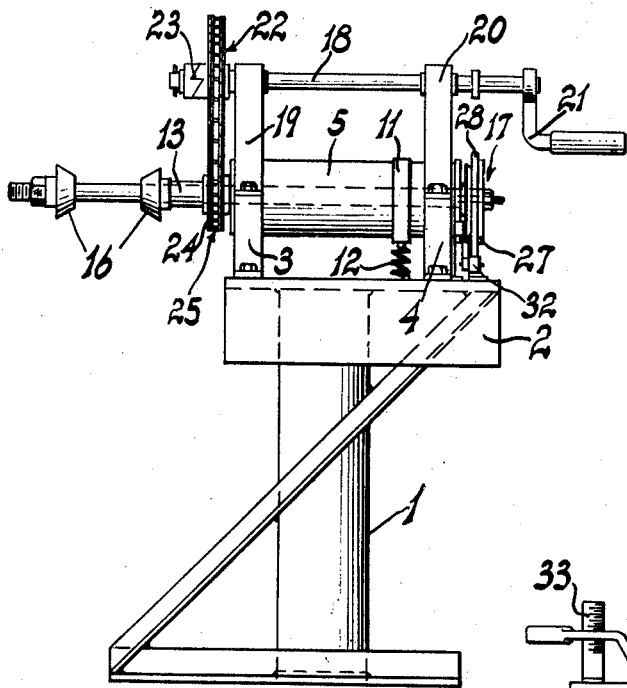
Figure 1 is a side elevation of my wheel balance tester.
Figure 2:
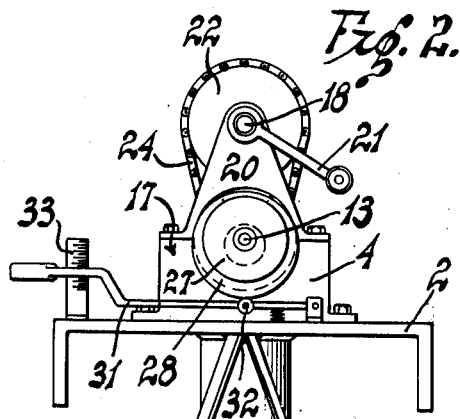
Figure 2 is an end view of the same.
Figure 3:
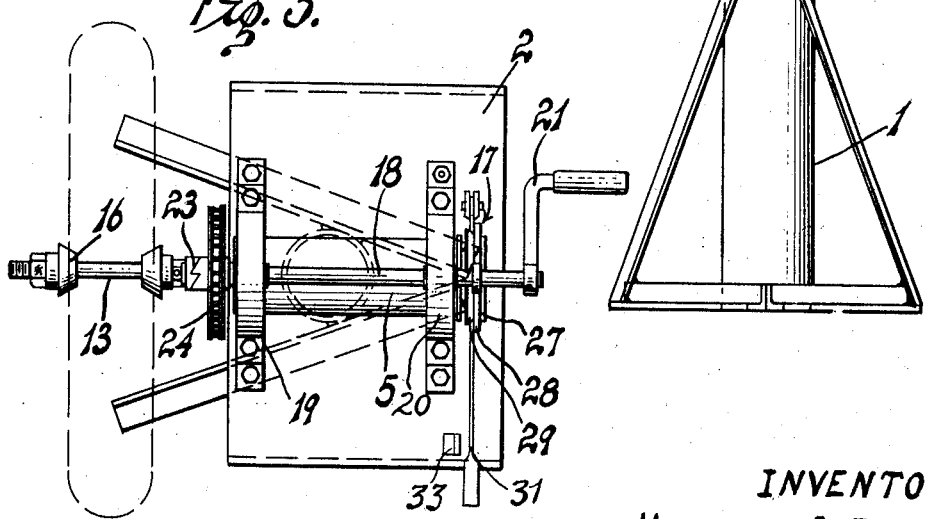
Figure 3 is a top plan view of the same.

Referring more particularly to the drawings, the numeral 1 indicates a base, which supports a table 2. A pair of brackets 3, 4 rise from the table 2 and are suitably attached to said table. A sleeve 5 is non-rotatably mounted in the brackets 3, 4 in the following manner:

A ring 6, preferrably of rubber, is mounted in grooves 7, 8 in the sleeve 5, and bracket 3, respectively. Thus, a certain amount of universal lateral movement is permitted in the sleeve 5, but this sleeve is held fairly central in the bracket 3. The other end of the sleeve 5 extends into an enlarged hole 9 in the bracket 4, and the sleeve is free to move or vibrate within the bracket. To hold the sleeve 5 in a horizontal position in the brackets during the static testing of the wheel, a rubber block 10 bears against the top of the sleeve 5, and this rubber block is positioned within the enlarged hole 9. The sleeve 5 may also be held in horizontal position by means of a band 11, to which a spring 12 is attached, the spring yieldably holding the sleeve in horizontal position but allowing wobbling movement of the end of the sleeve adjacent the same, as will be further described.

A wheel supporting shaft or mandrel 13 is journaled in bearings 14, 15 in the sleeve 5. The mandrel 13 projects from the sleeve 5 at both ends of the sleeve, and suitable cones 16 on one end of the mandrel provide means for mounting the vehicle wheel fixedly on the mandrel. The other end of the mandrel carries the indicating means 17, which will be further described. The mandrel is rotated through the shaft 18, which is journaled in bearings 19 and 20, arranged above the brackets 3 and 4 respectively. The shaft 18 is manually rotated by the crank 21. A sprocket 22 is journaled on the shaft 18 and is engageable by the clutch 23 when the mandrel 13 is being driven. The clutch may be of the dog type, and is engaged or disengaged by longitudinal movement of the shaft 18. A chain 24 encircles the sprocket 22 and a sprocket 25 on the mandrel. Thus, by rotating the crank 21, the mandrel 13 may be rotated at speeds necessary to test the dynamic balance of the wheel and tire.

The indicating means 17 is mounted on the mandrel 13 opposite the vehicle wheel to be tested. The indicating means consists of a pair of spaced plates 26 and 27 fixedly attached to the mandrel 13, and a disk or ring 28 yieldably pressed against the plate 27 by the spring washer or disk 29. The spring washer 29 will frictionally hold the disk 28 in position against the plate 27. An enlarged hole 30 in the disk permits this disk to be shifted in any radial direction relative to the mandrel 13, so that the disk is thus mounted for universal lateral shifting movement with respect to the axis of the mandrel 13. An arm 31 is pivotally mounted on the top of the table 2, and a roller 32 on the arm is adapted to engage the periphery of the disk 28 when the arm 31 is raised. The swinging end of the arm 31 moves over a calibrated scale 33, which indicates the amount of eccentricity of the disk 28 with respect to the axis of the mandrel 13.

In testing a vehicle wheel, the wheel is first mounted on the end of the mandrel 13 between the cones 16. The static balance of the wheel can be easily determined by noting that portion of the wheel which tends to move to the bottom, and by placing weights opposite this heavy point of the wheel, the wheel is statically balanced. The mandrel 13 is now rapidly revolved, carrying with it the wheel, and if the wheel is dynamically unbalanced, the unbalanced forces will cause it to wobble. This wobbling movement will be imparted to the mandrel 13 and sleeve 5 so that the portion of the sleeve within the hole 9 will be moved over an annular path around the normal horizontal axis of the mandrel 13 which may be termed the reference axis, and the mandrel 13 will precess about such axis. While the mandrel and sleeve are wobbling as above described, the arm 31 is lifted to bring the roller 32 into engagement with the periphery of the disk 28 and shift the latter radially relative to the axis of the mandrel 13 until the disk runs true which will occur when it has been shifted sufficiently so that it is rotating on a center concentric with the reference axis, i. e. the normal horizontal center line of the mandrel 13. Thereupon the arm 31 is lowered to disengage the roller from the disk and the vehicle wheel and the mandrel 13 are now stopped from further rotation, and the eccentricity of the disk 28 with respect to the mandrel 13 is noted. By slowly rotating the vehicle wheel and mandrel and lightly holding the roller 32 of the arm 31 against the periphery of the disk 28, without disturbing its setting, the amount of eccentricity can be read on the scale 33. The amount of eccentricity determines the amount of weights to be added to the wheel to bring it into dynamic balance. The positions in which the added weights should be applied to the wheel may be determined by the location of the points of maximum eccentricity of the disk 28 with respect to the mandrel axis. Thus, the operator determines both the amount of the weights to be added to the wheel and the position that such weights should be placed on the wheel. The tension of the spring 29 will hold the disk 28 in any adjusted position.

Having described my invention, I claim:

1. A vehicle wheel balance tester comprising a sleeve, a pair of brackets in which said sleeve is mounted, yieldable means arranged between the sleeve and said brackets whereby the sleeve is free to vibrate, a mandrel journaled within the sleeve, wheel mounting means on one end of the mandrel, a disk mounted on the other end of the mandrel, said disk being of light material so that no appreciable counterbalancing effect is produced, said disk being shiftable transversely of the center line of the mandrel, and means engageable with said disk to shift said disk transversely of the center line of the mandrel while said mandrel is rotating, said disk being shiftable to a position concentric with the center of rotation of the mandrel.

2. A vehicle wheel balance tester comprising a sleeve, a pair of brackets in which said sleeve is mounted, means arranged between the sleeve and said brackets whereby the sleeve is free to vibrate, a mandrel journaled within the sleeve, wheel mounting means on one end of the mandrel, a disk mounted on the other end of the mandrel, said disk being formed of a light material so that no appreciable counterbalancing effect is produced, said disk being shiftable transversely of the center line of the mandrel, and means engageable with said disk to shift said disk transversely of the center line of the mandrel while said mandrel is rotating, said disk being shiftable to a position concentric with the center of the rotation of the mandrel, and spring means bearing against said disk whereby the disk is held in adjusted position.

3. A vehicle wheel balance tester comprising a sleeve, a pair of brackets in which said sleeve is mounted, means arranged between the sleeve and said brackets whereby the sleeve is free to vibrate, a mandrel journaled within the sleeve, wheel mounting means on one end of the mandrel, a disk mounted on the other end of the mandrel, said disk being shiftable transversely of the center line of the mandrel, and an arm pivotally mounted adjacent the disk, said arm being engageable with the periphery of said disk.

4. A vehicle wheel balance tester comprising a sleeve, a pair of brackets in which the sleeve is mounted, yieldable means arranged between the sleeve and the brackets, whereby the sleeve is free to vibrate, a mandrel journaled in the sleeve, wheel mounting means on one end of the mandrel, a pair of spaced plates fixedly mounted on the other end of the mandrel, a disk engaging one of the plates, yieldable means urging the disk against said plate, said disk being shiftable relative to the center line of the mandrel, said yieldable means bearing against the other plate.

5. A vehicle wheel balance tester comprising a sleeve, a pair of brackets in which the sleeve is mounted, yieldable means arranged between the sleeve and the brackets, whereby the sleeve is free to vibrate, a mandrel journaled in the sleeve, wheel mounting means on one end of the mandrel, a pair of spaced plates on the other end of the mandrel, a disk engaging one of the plates, yieldable means urging the disk against said plate, said disk being shiftable relative to the center line of the mandrel, an arm pivotally mounted adjacent said disk, said arm being engageable with the periphery of the disk, and a scale adjacent the swinging end of said arm.

6. A balance testing apparatus comprising a rotatable shaft to which an object to be tested may be fixed for rotation therewith, means mounting said shaft for universal lateral movement, whereby upon rotation of the object and shaft the latter is free to wobble about a reference axis under the influence of dynamic unbalance of the object, a ring mounted on said shaft for universal lateral shifting movement with respect to the shaft and freely shiftable under the application of pressure to any point thereof in a direction transverse to its axis, whereby said ring may be shifted to a position concentric to said reference axis by the application of pressure to a peripheral surface of the ring during revolution of said surface relative to the point of application of said pressure, and means for maintaining the ring in its shifted position to thereby indicate the amount and location of the dynamic unbalance of the object.

7. An apparatus for checking the dynamic unbalance of wheels and the like comprising a rotatable wheel support having means for mounting a wheel thereon for movement as a unit therewith and with the wheel axis in alignment with the axis of said support, means mounting said support for universal lateral movement whereby upon rotation of said wheel and support dynamic unbalance of the wheel will cause wobbling of the wheel and support about a reference axis, a ring mounted on said support for rotation therewith and universally radially shiftable with respect thereto under application of pressure, to any point thereof in a direction transverse to its axis, means for applying pressure to a peripheral surface of the ring during revolution of said surface relative to said pressure applying means for shifting the ring into a position concentric to said reference axis, and means for maintaining the ring in its shifted position to thereby indicate the amount and location of the dynamic unbalance of the wheel.

8. An apparatus for checking the dynamic unbalance of wheels and the like comprising a rotatable wheel supporting shaft having means for axially mounting a wheel thereon for movement as a unit therewith, means mounting said shaft for universal lateral movement, whereby upon rotation of the wheel and shaft the latter will wobble under the influence of dynamic unbalance of the wheel, an indicator ring carried by said shaft for rotation therewith, said ring being universally radially shiftable with respect to said shaft upon application of pressure to any point of the ring transverse to its axis, means engageable with a peripheral surface of said ring during rotation thereof relative thereto for shifting the ring radially of said shaft until said ring runs true, and means for maintaining the ring in said position to thereby determine the amount and location of the dynamic unbalance of the wheel by the position of the disc with respect to the axis of the wheel.

9. An apparatus for checking the dynamic unbalance of wheels and the like comprising a rotatable wheel supporting shaft, means for mounting a wheel upon the shaft at one end thereof for movement as a unit therewith and with the wheel axis in alignment with the axis of said shaft, means mounting said shaft for universal lateral movement whereby upon rotation of the wheel and shaft dynamic unbalance of the wheel will cause wobbling of said wheel and shaft about a reference axis, an indicator ring mounted on the other end of said shaft for rotation therewith, said indicator ring being universally radially shiftable with respect to said shaft under the application of pressure to any point of said ring in a direction transverse to its axis, means engageable with a peripheral surface of the ring during revolution of said surface relative to said last named means for shifting the ring into a position concentric to said reference axis, and means for maintaining the ring in its shifted position to thereby indicate the amount and location of the dynamic unbalance of the wheel.

10. A vehicle wheel balance tester comprising a pair of horizontally spaced brackets, a sleeve mounted in said brackets, rubber blocks mounted in the brackets and engaging the outer surface of the sleeve whereby the sleeve is non-rotatably held and free to vibrate relative to the brackets, a mandrel journaled in the sleeve, said mandrel protruding from both ends of the sleeve, wheel mounting means on one end of the mandrel, a disc shiftably mounted on the other end of the mandrel and rotatable with the mandrel, said disc being shiftable transversely of the center line of the mandrel to a position concentric with the center of the rotation of the mandrel, said disc being formed of a light material and having no appreciable counterbalancing effect on the wheel which may be mounted on the mandrel, and manually operatable means engageable with said disc to shift said disc transversely of the center line of the mandrel while said mandrel and disc are rotating.

11. A balance testing apparatus comprising a rotatable shaft for supporting the object to be tested for movement as a unit therewith, means for mounting the shaft for universal lateral movement, whereby upon rotation of the object and shaft the latter is free to vibrate about a reference axis under the influence of dynamic unbalance of the object, a light ring affording substantially no counterbalancing effect mounted on said shaft for rotation therewith and universally laterally shiftable with respect thereto, a pivotally mounted arm engageable with a peripheral surface of said ring for shifting the same into a position concentric to said reference axis during vibration of said shaft and object, and means for maintaining the ring in its shifted position to thereby indicate the amount and location of the dynamic unbalance of the object.

ULYSSES A. INMAN.